(12) United States Patent
Fujisawa

(10) Patent No.: US 10,114,598 B2
(45) Date of Patent: Oct. 30, 2018

(54) IMAGE FORMING APPARATUS AND METHOD OF CONTROLLING THE SAME, IN WHICH IMAGE FORMATION IS STOPPED IN ACCORDANCE WITH OBTAINED ERROR INFORMATION

(71) Applicant: CANON KABUSHIKI KAISHA, Tokyo (JP)

(72) Inventor: Minoru Fujisawa, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/452,826

(22) Filed: Mar. 8, 2017

(65) Prior Publication Data
US 2017/0269891 A1    Sep. 21, 2017

(30) Foreign Application Priority Data
Mar. 16, 2016 (JP) .................................. 2016-052969

(51) Int. Cl.
*G06F 3/12* (2006.01)
*H04N 1/00* (2006.01)

(52) U.S. Cl.
CPC ............ *G06F 3/1289* (2013.01); *G06F 3/121* (2013.01); *G06F 3/1207* (2013.01);
(Continued)

(58) Field of Classification Search
CPC .......... H04N 1/32502; H04N 1/32507; H04N 1/00885; H04N 1/00888; H04N 1/00896; H04N 1/32523; H04N 2201/0081; H04N 2201/0082; H04N 1/0057; H04N 1/00127; H04N 1/00222; H04N 1/60; H04N 2201/0091; H04N 2201/3205;
(Continued)

(56) References Cited

U.S. PATENT DOCUMENTS 7,830,540 B2 * 11/2010 Matsuda ............ H04N 1/32619
358/1.15
8,477,350 B2    7/2013 Jazayeri et al.
(Continued)

FOREIGN PATENT DOCUMENTS

JP    2006-211560 A    8/2006
JP    2014-068305 A    4/2014
(Continued)

*Primary Examiner* — Henok A Shiferaw
(74) *Attorney, Agent, or Firm* — Fitzpatrick, Cella, Harper & Scinto

(57) ABSTRACT

An image forming apparatus, capable of communicating with a server, includes an image forming device configured to form an image on a sheet based on print data, and at least one processor that obtains print data transmitted from the server, causes the image forming device to start image formation based on the obtained print data, and notifies the server of identification information of the print data after the start of the image formation. In addition, the at least one processor receives error information from the server as a response to the notification in a case that the server determines that the identification information of the print data does not match identification information stored in the server, and causes the image formation by the image forming device to stop in accordance with receiving the error information.

15 Claims, 12 Drawing Sheets

(52) U.S. Cl.
CPC .......... *G06F 3/1211* (2013.01); *G06F 3/1236* (2013.01); *G06F 3/1285* (2013.01); *H04N 1/00244* (2013.01)

(58) Field of Classification Search
CPC ....... H04N 2201/3276; H04N 1/00244; H04N 1/00631; H04N 1/00795; H04N 1/00832; H04N 1/0084; H04N 1/00854; H04N 1/00875; H04N 1/00912; H04N 1/3873; H04N 1/40031
See application file for complete search history.

(56) References Cited

U.S. PATENT DOCUMENTS

| | | | |
|---|---|---|---|
| 8,867,069 B2 | 10/2014 | Jazayeri et al. | |
| 8,867,070 B2 | 10/2014 | Jazayeri et al. | |
| 8,908,223 B2 | 12/2014 | Ono et al. | |
| 9,007,640 B2* | 4/2015 | Kishimoto | H04N 1/00233 358/1.15 |
| 2016/0316082 A1* | 10/2016 | Ishii | H04N 1/00477 |
| 2017/0228197 A1* | 8/2017 | Watanabe | G06F 3/1204 |

FOREIGN PATENT DOCUMENTS

| | | |
|---|---|---|
| JP | 2014-106825 A | 6/2014 |
| JP | 2015-092394 A | 5/2015 |

\* cited by examiner

FIG. 8

| PRINTER ID (801) | USER ID (802) | PRINT DATA IDENTIFIER (803) | PRINT DATA NAME (804) | PRINT STATUS (805) | PRINTED PAGES (806) | ... |
|---|---|---|---|---|---|---|
| A | abc | a | aaa.pdf | PRINTING | 50/200 | ... |
| B | | b | bbb.jpg | WAITING | 0/100 | ... |
| A | def | c | ccc.ras | WAITING | 0/20 | ... |
| ⋮ | ⋮ | ⋮ | ⋮ | ⋮ | ⋮ | ⋮ |

FIG. 10

| | 1001 | 1002 | 1003 | 1004 | 1005 | |
|---|---|---|---|---|---|---|
| | DATE AND TIME | USER ID | PRINT DATA NAME | PRINT RESULT | PRINTED PAGES | ... |
| | 2015/12/09 21:29 | abc | aaa.pdf | CANCEL | 50/200 | ... |
| | 2015/12/08 17:00 | | bcd.jpg | COMPLETE | 150/150 | ... |
| | 2015/12/07 18:01 | def | efg.ras | COMPLETE | 30/30 | ... |
| | ⋮ | ⋮ | ⋮ | ⋮ | ⋮ | ⋮ |

…

IMAGE FORMING APPARATUS AND METHOD OF CONTROLLING THE SAME, IN WHICH IMAGE FORMATION IS STOPPED IN ACCORDANCE WITH OBTAINED ERROR INFORMATION

BACKGROUND OF THE INVENTION

Field of the Invention

The present invention relates to an image forming apparatus, a method of controlling the same, and a storage medium.

Description of the Related Art

There is a system in which print data from a client terminal such as a mobile terminal is input to a network server of a cloud or the like, the server converts the print data into print data of a format for a printer, and the printer downloads the converted print data and prints it. In such a system, after conversion to print data by the server has completed, the server exchanges information with the printer by a specific communication method, and the existence of the print data is notified to the printer from the server. This notification typically includes an identifier of the print data. The printer that receives this notification can use the identifier of the print data included in the notification to download the print data from the server and perform printing (for example, refer to Japanese Patent Laid-Open No. 2015-92394).

In the cloud printing service described above, when printing of the print data inputted to the server from the client terminal is cancelled, there are cases where a printer that downloads the print data from the server to print it cannot cancel the printing. This corresponds to a case such as where the printer is installed in an office, and the client terminal instructs printing to the printer from outside of the office via a cloud server. As a result, because the printer cannot recognize that the client terminal is cancelling the printing, the print data is printed, and unnecessary paper or toner is used.

In addition, in a typical printer, although a print result is recorded as history information, the details of this history become history that differs to the operation that the client terminal intended.

SUMMARY OF THE INVENTION

An aspect of the present invention is to eliminate the above-mentioned problems that are found in the conventional technology.

A feature of the present invention is to provide a technique for, when printing is cancelled by a server, detecting the cancellation of the printing by the printer, and stopping print processing.

According to a first aspect, the present invention provides an image forming apparatus capable of communicating with a server, the apparatus comprising an image forming unit configured to form an image on a sheet based on print data, a memory device that stores a set of instructions, and at least one processor that executes instructions out of the instructions to obtain print data from the server, to cause the image forming unit to start image formation based on the print data, to notify the server of identification information of the print data after the start of image formation, and to cause the image formation by the image forming unit to stop in accordance with obtaining error information relating to the identification information from the server as a response to the notification.

According to a second aspect, the present invention provides an image forming apparatus able to communicate with a server, the apparatus comprising an image forming unit configured to form an image on a sheet based on print data, a memory device that stores a set of instructions, and at least one processor that executes instructions out of the instructions to obtain print data from the server, store the print data in a memory, to transmit identification information of the print data to the server after the print data has been stored in the memory, and, in accordance with obtaining error information relating to the identification information from the server, in response to transmission of the identification information, to delete the print data corresponding to the error information that is stored in the memory.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a figure for describing an example of print data information which a server according to the first embodiment manages.

FIG. 10 is a figure illustrating an example of a print history which the printer according to the first embodiment records in step S913 of FIG. 9.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

Figure 1:
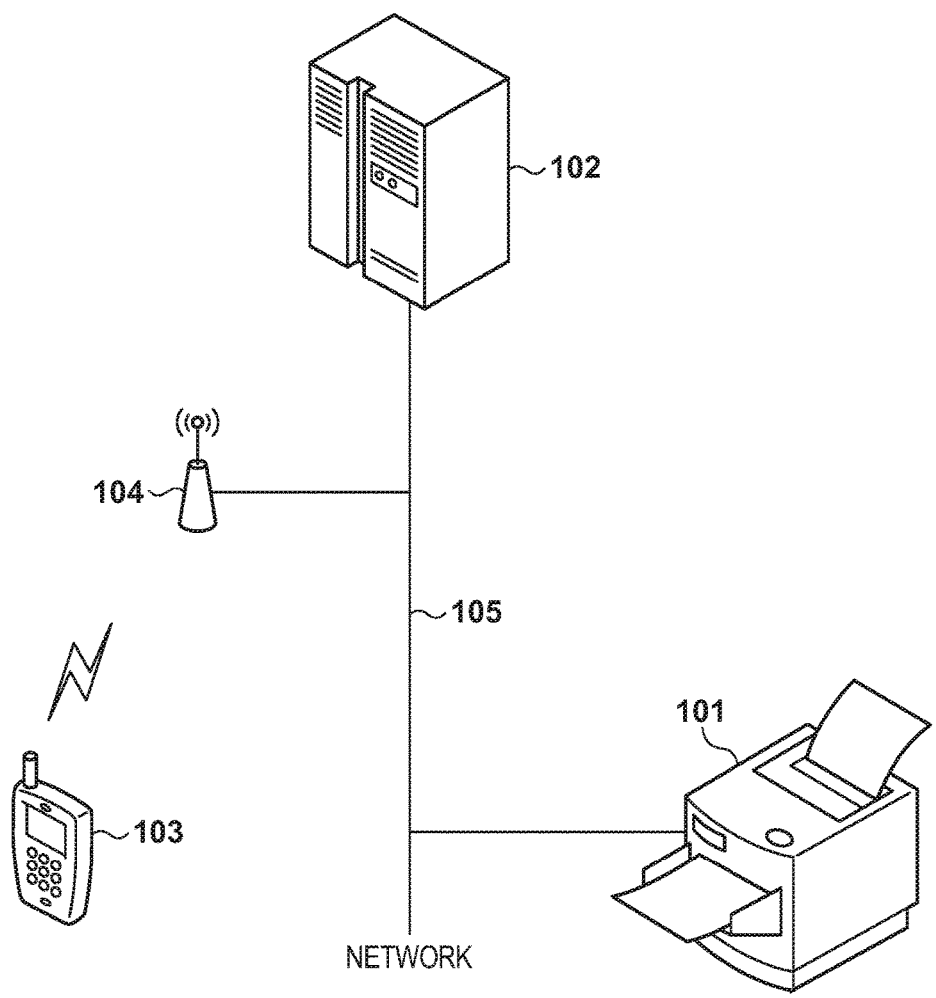
FIG. 1 is a figure for describing an overall configuration of a print system including a printer according to a first embodiment of the present invention.

FIG. 1 is a figure for describing an overall configuration of a print system including a printer 101 according to a first embodiment of the present invention.

In this print system, the printer 101 and a server 102 are connected via a network 105, and can communicate with each other. A client terminal 103 can connect to the network 105 via an access point 104, and is capable of two-way communication with the server 102 via the network 105.

Figure 2:
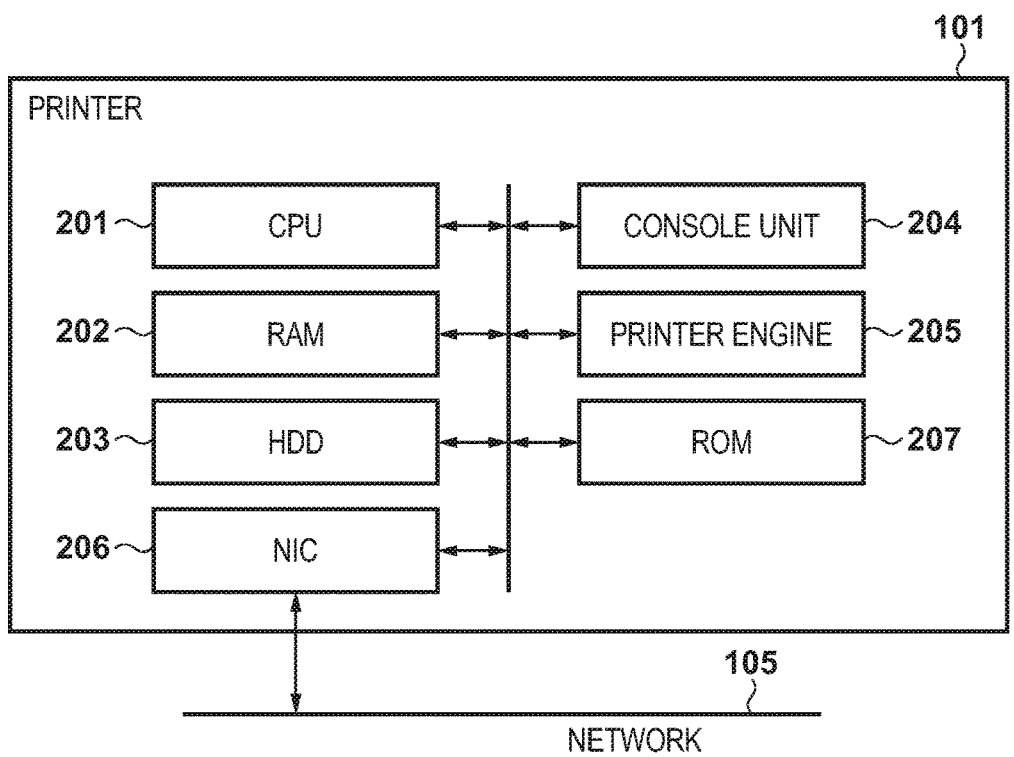
FIG. 2 is a block diagram for describing a hardware configuration of the printer according to the first embodiment.

FIG. 2 is a block diagram for describing a hardware configuration of the printer 101 according to the first embodiment.

The printer 101 is connected to the network 105 via an NIC (Network Interface Controller) 206. A CPU 201 executes a boot program stored in a ROM 207, deploys a program stored in an HDD 203 to a RAM 202, and performs control of the printer 101 overall by executing the program. The RAM 202 is a random access memory, and, when the CPU 201 controls the printer 101, is used in storage of temporary data and various task processing after a firmware activation. The HDD 203 is a hard disk drive, stores the program of the printer 101, and is used in saving various settings values and spooling print data. A console unit 204 is provided with a display panel, displays various operating screens, and transfers an instruction inputted from a user via the operating screen to the CPU 201. A printer engine 205 prints an image based on image data on a recording medium. When printing, the CPU 201 performs processing such as color conversion, filtering processing and resolution conversion for the print data. The NIC 206 connects with the network 105, and controls data communication with an external apparatus (the server 102) on the network 105.

Figure 3:
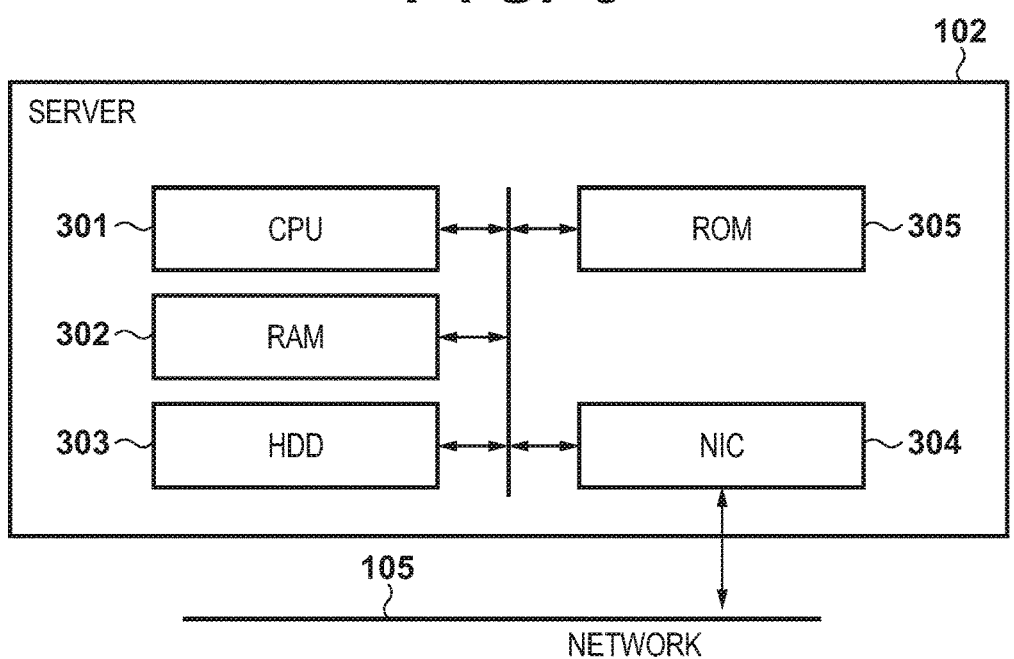
FIG. 3 is a block diagram for describing a hardware configuration of a server according to the first embodiment.

FIG. 3 is a block diagram for describing a hardware configuration of the server 102 according to the first embodiment.

The server 102 is connected to the network 105 via an NIC 304. A CPU 301 executes a boot program stored in a ROM 305, deploys a program stored in an HDD 303 to a RAM 302, and performs control of the server 102 overall by executing the deployed program. The RAM 302 is a random access memory, and, when the CPU 301 controls the server 102, is used in storage of temporary data and various task processing after a firmware activation. An HDD 303 is used in saving various settings values and management information of the server 102, and in storing the print data.

Figure 4:
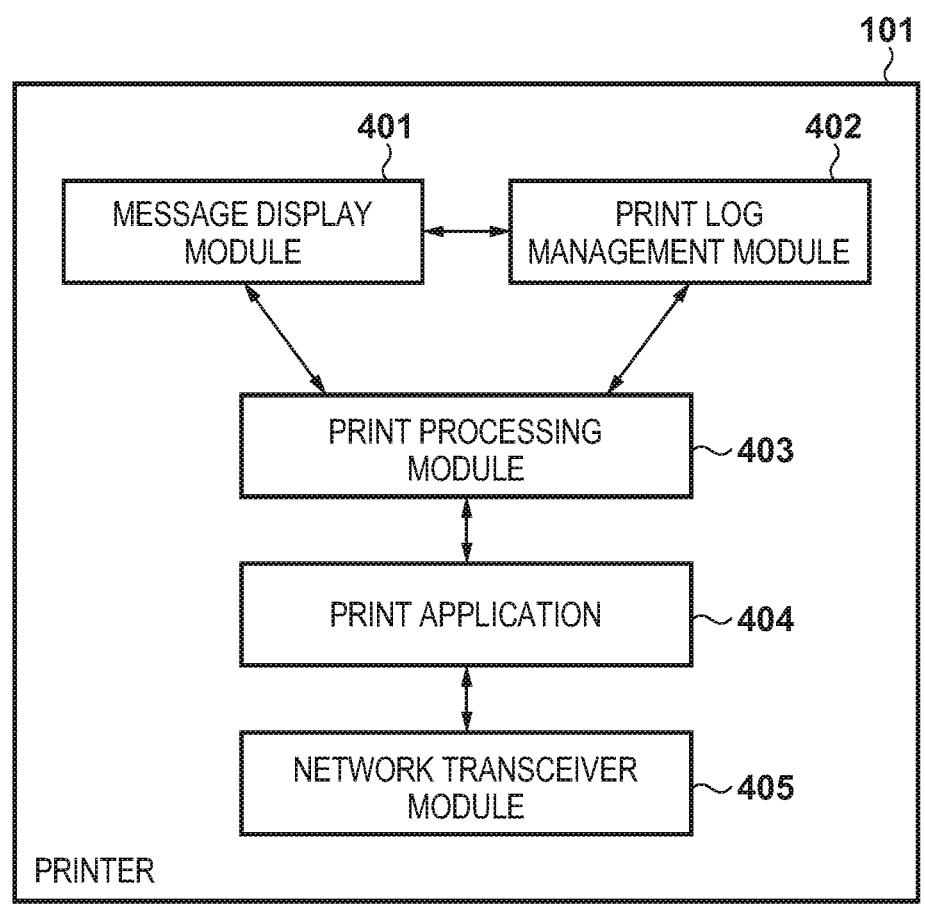
FIG. 4 is a block diagram for describing a software configuration of the printer according to the first embodiment.

FIG. 4 is a block diagram for describing a software configuration of the printer 101 according to the first embodiment. Note that functions of the modules illustrated in FIG. 4 are realized by the CPU 201, for example, executing a program deployed from the HDD 203 to the RAM 202.

A message display module 401, via the console unit 204, presents various kinds of settings regarding printing to a user, and displays to a user of the printer 101 a status or a history of printing that is received from a print processing module 403 or a print log management module 402. The print log management module 402 manages a print history. Here, history information of each piece of print data, which is described later with reference to FIG. 10, is managed. The print processing module 403 performs image analysis processing such as color conversion, filtering, and resolution conversion for the print data received from an external unit, and controls processing for the printer engine 205 to print to a sheet and discharge. A print application 404 performs, via a network transceiver module 405, various kinds of communication processing with the server 102 for printing. The various kinds of communication processing referred to here includes at least reception of print data or an existence notification of print data from the server 102, a request for a download of print data to the server 102, and print status notification processing. The network transceiver module 405 generates a network packet and transmits to the server 102, in accordance with various transmission instructions from the print application 404. Also, a notification from the server 102 or response data is received and then analysis processing is performed. For example, in a case when the server 102 is a cloud server on the Internet, the network transceiver module 405 performs processing of a network protocol, such as an HTTP protocol, SSL, or XMPP.

Figure 5:
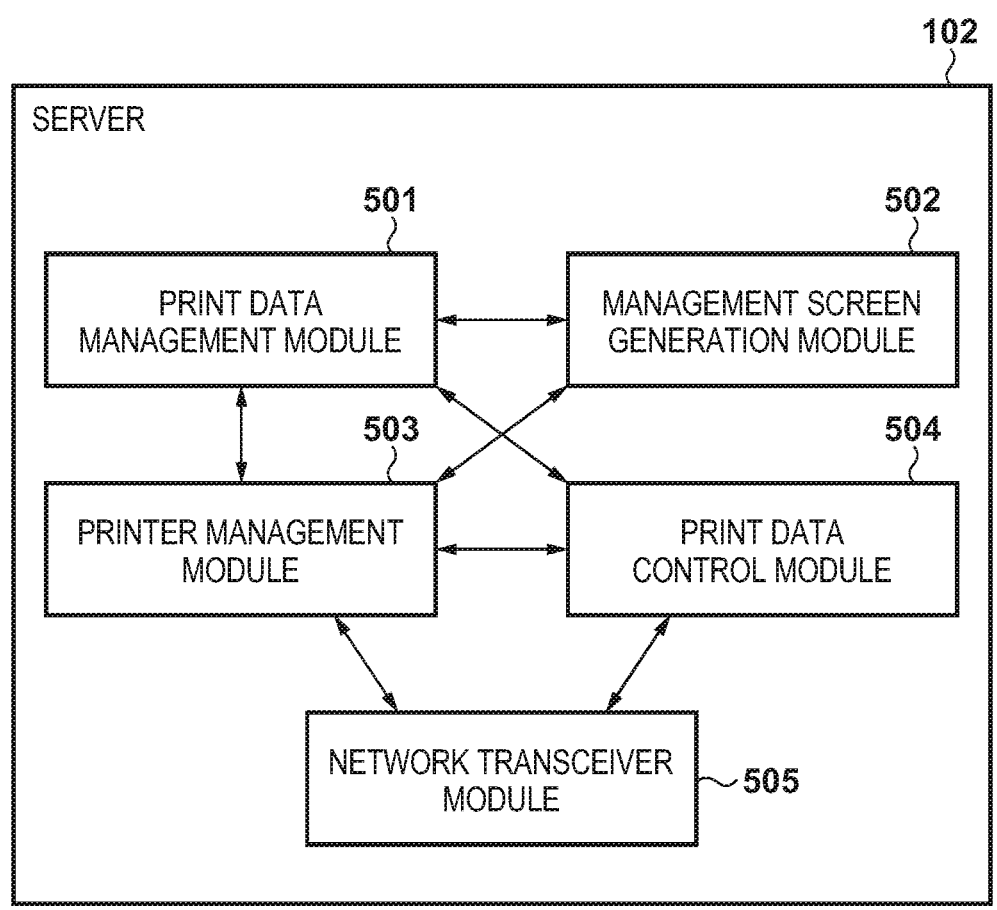
FIG. 5 is a block diagram for describing a software configuration of the server according to the first embodiment.

FIG. 5 is a block diagram for describing a software configuration of the server 102 according to the first embodiment. Note that a function of the modules illustrated in FIG. 5 is realized by the CPU 301, for example, executing a program deployed from the HDD 303 to the RAM 302.

A print data management module 501 stores and manages print data inputted from the client terminal 103 via the network 105 in the HDD 303. Information of the print data managed here includes not just the actual print data, but information such as an ID described later with reference to FIG. 8. The print data management module 501 receives and manages this information from the client terminal 103 and, when the print processing is actually performed, transmits the information to the printer 101 at a time of reference numeral 603 of FIG. 6 which is described later. When the server 102 receives a print status notification 605 of later-described FIG. 6 from the printer 101, the print data management module 501 updates management information of later-described FIG. 8 based on the print status notification information. A management screen generation module 502 obtains information of the print data being managed by the print data management module 501, and information of printers being managed by a printer management module 503, and generates a management screen. The management screen indicates a screen displayed in a user interface of the server 102, or a screen of a management information site for print data and printers published on the Internet. The printer management module 503 stores various kinds of information of printers managed by the server 102 in the HDD 303, and manages it. The various kinds of information of the printers includes various print setting values supported by the printer 101, a current status of the printer 101, or the like. As an example of the various print setting values, a size or color of a print sheet supported by the printer 101, a function for black and white printing, the existence or absence of support for double-sided printing, a number of paper feed trays, or the like can be given. As an example of the current status of the printer, a remaining amount of toner of the printer, the existence or absence of sheets in a paper feed tray, the existence or absence of a jam detection, an open/close status of a cover, or the like can be given.

The server 102 receives from the client terminal 103 a request such as for what print data and which printer to use to perform printing. By the printer management module 503 and the print data management module 501 cooperating to perform processing with respect to the request, the server 102 can specify by which printer to print the print data inputted from the client terminal 103.

A print data control module 504 generates print data, and performs image conversion processing. There is the possibility that a format of the print data inputted from the client terminal 103 cannot be printed by the printer being managed by the server 102. Accordingly, the print data control module 504 obtains from the printer management module 503 information of the printer that is to perform printing, and obtains formats of print data that the printer supports. In the case that the format of the inputted print data is a format that is not supported by the printer, the print data control module 504 performs a conversion to a print data format that the printer supports. Upon receiving various transmission instructions from the printer management module 503 or the print data control module 504, a network transceiver module 505 generates a network packet, transmits it to the printer 101, receives a notification and various requests from the printer 101, and performs analysis processing. For example, in a case when the server 102 is a cloud server on the Internet, the network transceiver module 505 performs processing of a network protocol, such as an HTTP protocol, SSL, or XMPP.

Figure 6:
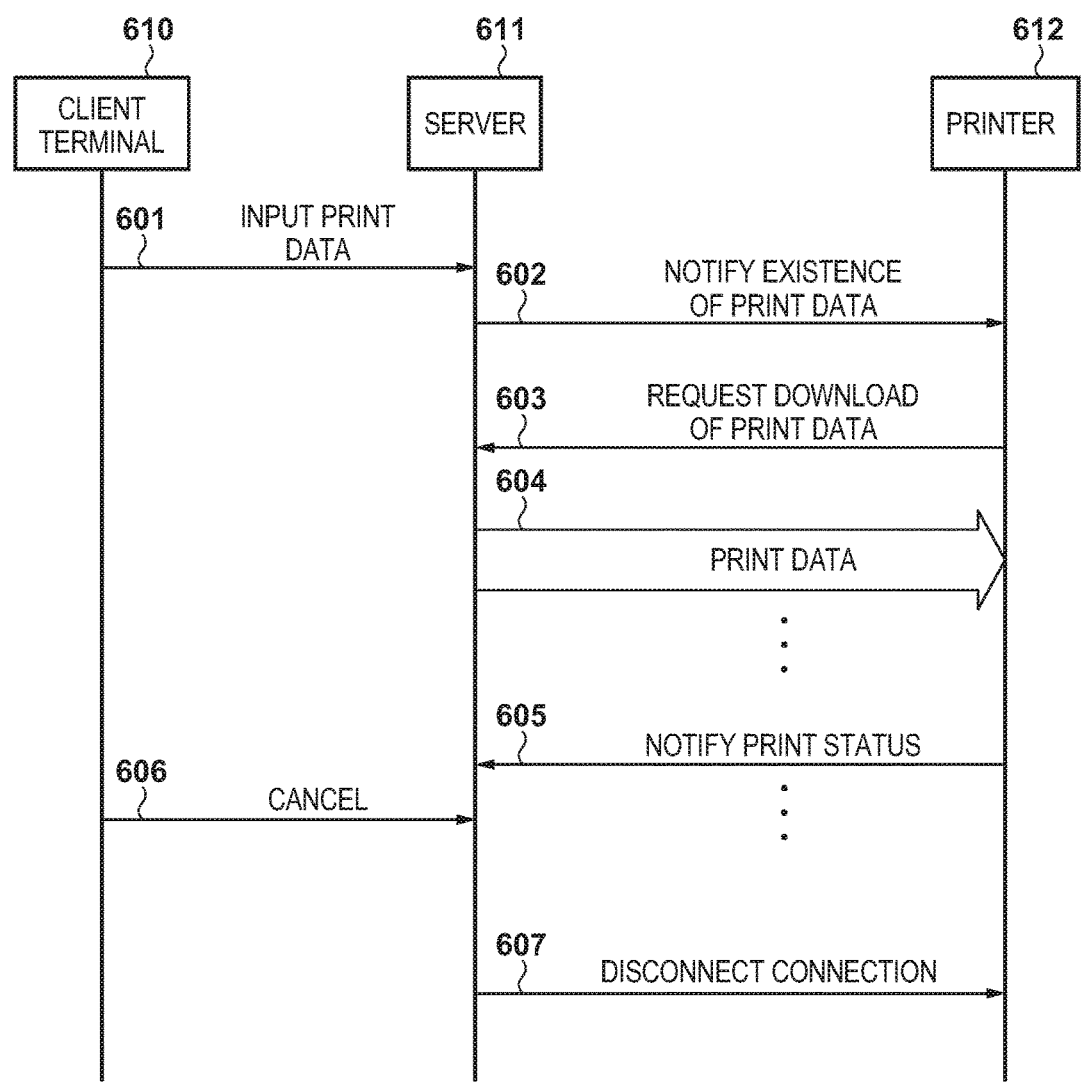
FIG. 6 depicts a view for describing an example of a processing sequence in a conventional print system.

FIG. 6 depicts a view for describing an example of a processing sequence in a conventional print system.

Firstly, at reference numeral 601, a client terminal 610 inputs to a server 611 print data that is to be printed by using a printer 612. When the client terminal 610 inputs the print data, the client terminal 610 transmits it to the server 611 together with an ID of a user who operates the client terminal 610.

At reference numeral 602, the server 611 notifies the printer 612 that print data has been inputted, and that the print data is present.

At reference numeral 603, upon receiving the existence notification 602 of the print data, the printer 612 makes a request for download of the print data to the server 611. In a download process for the print data, an identifier (identification information) of the print data that is a target of the downloading, and various settings values necessary for print processing are included.

At reference numeral 604, the server 611 transmits the print data to the printer 612 in response to the download request 603 from the printer 612.

At reference numeral 605 the printer 612 receives the print data and starts print processing. After starting this print processing, the printer 612 notifies the server 611 of a total number of pages to be discharged by the print processing and a number of pages currently discharged together with the identifier of the print data. The notification processing is performed each time the printer 612 has printed and discharged a specific number of pages, or each predetermined amount of time.

At reference numeral 606, the client terminal 610 performs a cancel instruction for print processing in accordance with deletion of the print data input to the server 611 at reference numeral 601. By this cancel instruction being performed, the server 611 deletes the print data that is the target thereof, and deletes information relating to the print data such as the identifier of the print data. Deletion of information or a file by the cancel instruction is not notified to the printer 612. Therefore, the printer 612 cannot recognize the cancellation of the print data.

Here, at the point in time when the cancel instruction is instructed to the server 611, the printer 612 is in the middle of continuously receiving the print data sent from the server 611. With an objective of improving print performance, instead of printing after all data of the print data has been received, the printer 612 successively performs print processing for print data received via the network, and simultaneously performs reception processing for subsequent data.

Next, at reference numeral 607, the server 611, when printing is cancelled from the client terminal 610 by the cancel instruction 606 while the printer 612 continues to receive print data, cannot continue to send print data to the printer 612. Accordingly, the server 611 cuts the communication connection for downloading the print data that was established with the printer 612.

By such a sequence, after receiving and performing print processing until part way through the print data, the printer 612 enters a status in which processing is not possible for the print data that could not be received. There are also cases in which, due to a format of the print data, an analysis of the print data by the printer 612 is not possible if all of the print data has not been received. As a result, in spite of the fact that the client terminal 610 has cancelled printing, the printer 612 determines an analysis error, an error is recorded as print history, and it ceases to be possible to record that printing has been cancelled as the print history.

Figure 7:
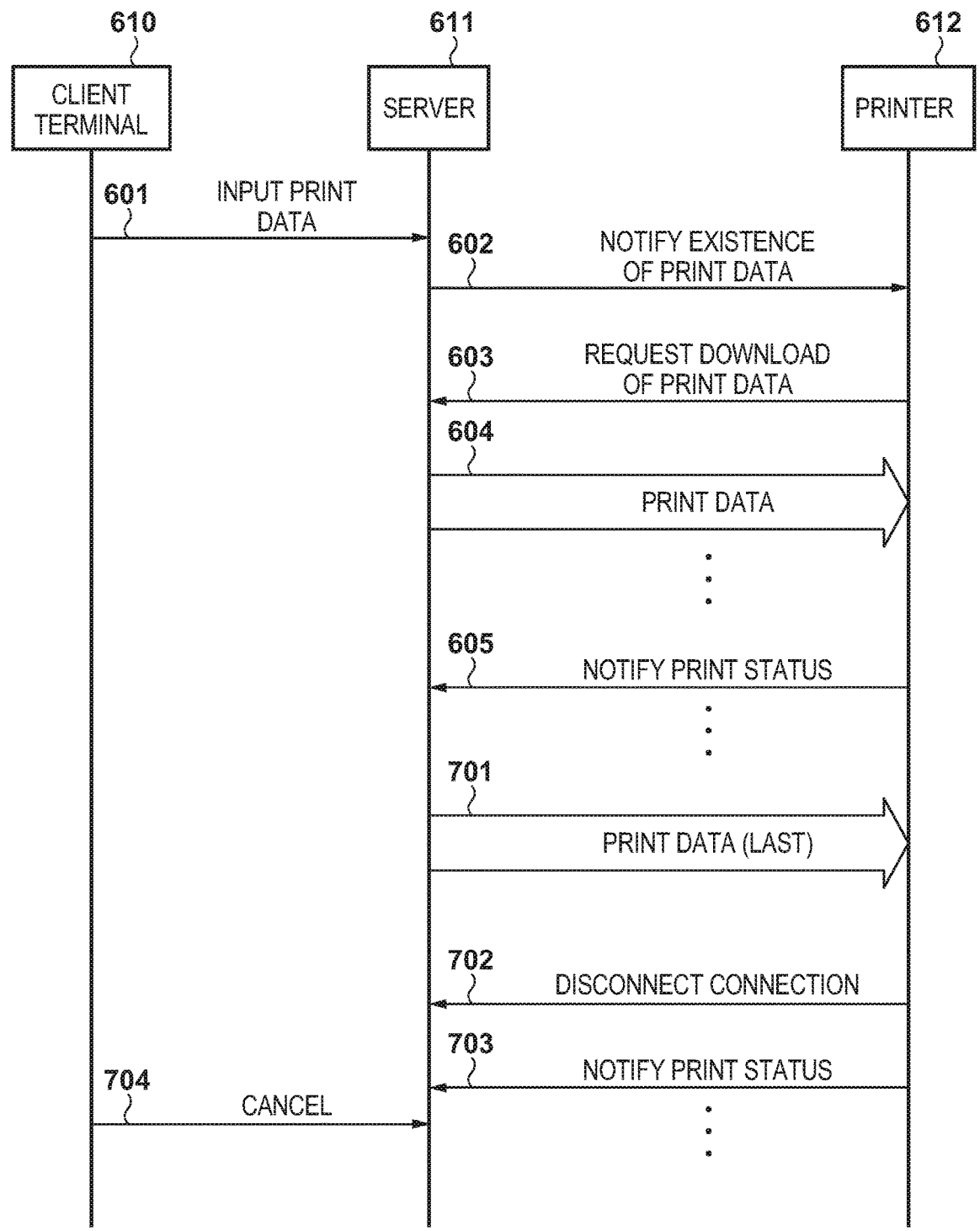
FIG. 7 depicts a view for describing another example of a processing sequence in a conventional print system.

FIG. 7 depicts a view for showing another example of a processing sequence in a conventional print system. Because the processing of reference numerals 601 through 605 in FIG. 7 is the same as the detail explained in FIG. 6, explanation thereof is omitted.

At reference numeral 701, the server 611 completes transmission of all print data to be transmitted to the printer 612. At reference numeral 702, the printer 612 detects that all of the print data has been downloaded, and cuts the communication connection for downloading print data that was established with the server 611. At this point, although download of the print data is complete at reference numeral 702, print processing by the printer 612 is continuing. Accordingly, the printer 612 continues to perform the print status notification 703 to the server 611 until printing of all pages of the print data has completed.

At reference numeral 704 the client terminal 610 performs a cancel instruction for print processing in accordance with deletion of the print data input to the server 611 at reference numeral 601. Due to this cancel instruction, the server 611 deletes the print data. Deletion of information or a file by the cancel instruction is not notified to the printer 612. Therefore, the printer 612 cannot recognize the cancellation of the print data. Note that, at the point in time when the cancel instruction is instructed to the server 611, the printer 612 is continuing print processing in accordance with the print data received thus far. In this way, upon the printer 612 completing print processing of all pages of the print data, in spite of the fact that the client terminal 610 is instructing cancellation of the print data, the printer 612 determines print completion as a print result. Print completion is then recorded as the print history, and print cancellation is not recorded.

FIG. 8 is a figure for describing an example of print data information which the server 102 according to the first embodiment manages.

A printer ID 801 is an identifier of a printer that the printer management module 503 of the server 102 manages. The printer management module 503 uses the printer ID 801 to manage various print setting values of each printer and a printer's current status information. A user ID 802 is an identifier of a user who is operating the client terminal 103, and is included in the print data transmitted from the client terminal 103. By this, the server 102 can identify which user is making a print request from the client terminal 103. A print data identifier 803 is an identifier (ID) for the server 102 to manage print data input by the client terminal 103, and is generated by the server 102. The print data identifier 803 is used in the print processing or print status notification processing between the server 102 and the printer 101, by being sent from the server 102 to the printer 101. A print data name 804 is a name of the print data inputted to the server 102, and is displayed on a print data management screen by the management screen generation module 502. It is received together with the print data when the printer 101 downloads the print data, and the message display module 401 of the printer 101 displays it as the name of the print data on the console unit 204, and it is managed as the history information of the print processing by the print log management module 402. A print status 805 indicates a print processing status for each piece of print data. This print processing status includes statuses that indicate print results: "waiting" that indicates before a print start, "printing" that indicates that print processing is being performed normally, and "interrupt" that indicates that printing by the printer 101 has been interrupted for some reason. As an example of interrupt, for example a toner outage of the printer 101, a paper feed tray being out of paper, an open cover, the occurrence of a jam, or the like can be given. The printer 101 successively notifies the print status to the server 102, and the server 102 manages information indicating the print status as a processing status of the print data. Printed pages 806 indicates a number of pages that have been printed and a total number of pages scheduled to be printed for the print data printed by the printer 101. The printer 101 notifies the server 102 of a total number of pages to be discharged by the print processing of the print data and a number of pages currently discharged together with the identifier of the print data. The server 102 manages this information as a number of printed pages.

Figure 9:
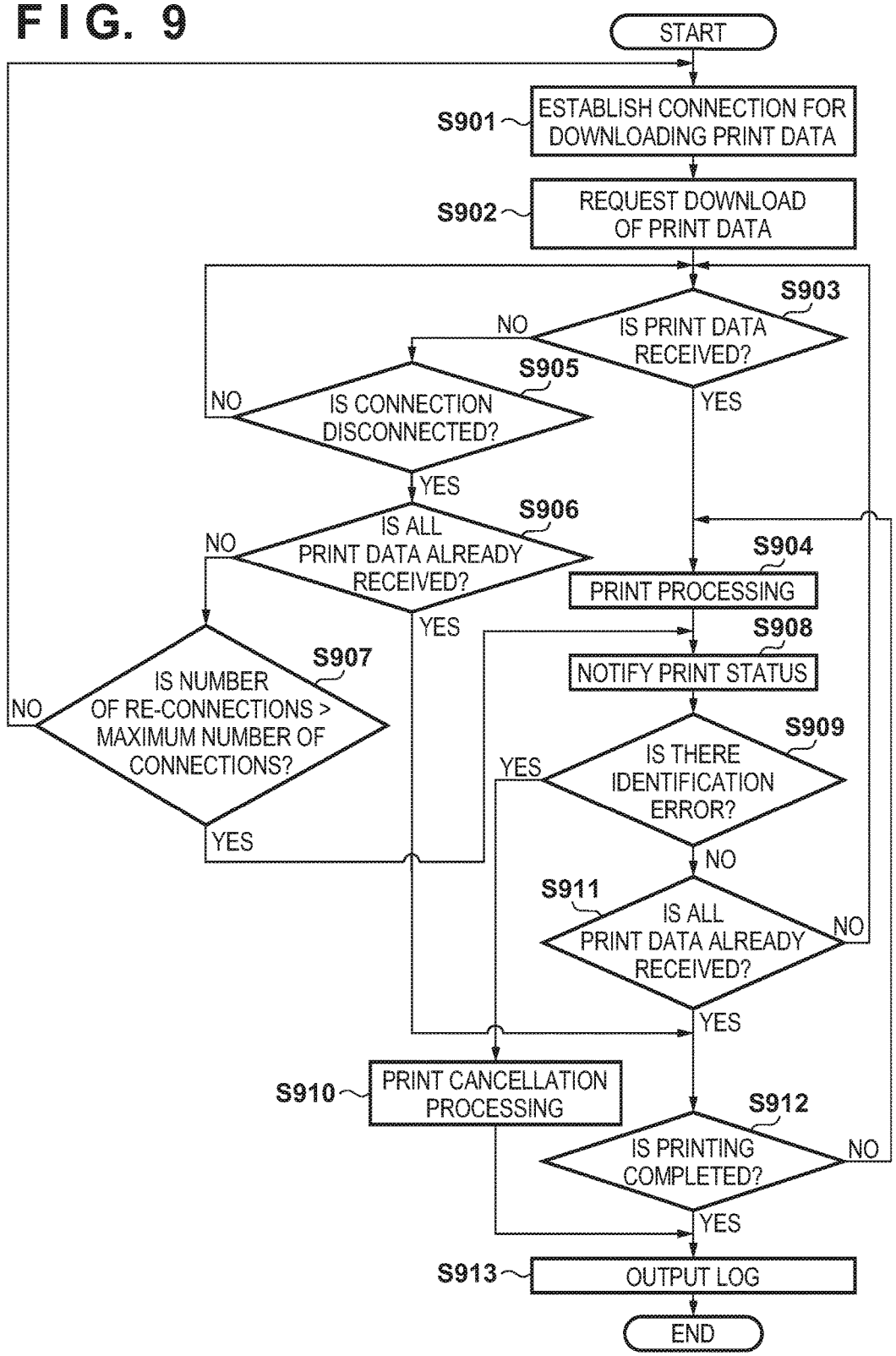
FIG. 9 is a flowchart for describing print processing by the printer according to the first embodiment.

FIG. 9 is a flowchart for describing print processing by the printer 101 according to the first embodiment. Note that a program for causing the CPU 201 to execute this processing is stored in the HDD 203, and, at a time of execution, the CPU 201 deploys this program to the RAM 202 and executes it to thereby achieve the processing indicated by this flowchart. Note that explanation is given here of processing that the software function illustrated in FIG. 4 executes.

The processing is started by the print application 404 receiving an existence notification of print data from the server 102 via the network transceiver module 405. Firstly, in step S901 the print application 404 performs a communication connection for performing a download request of the print data to the server 102, via the network transceiver module 405. Next the processing proceeds to step S902, and the print application 404 uses the connection with the server 102 to make a request to the server 102 for download of the print data. At the time of this request, the print application 404 obtains from the server 102 the print data identifier 803 of the download target, and also various settings values necessary for print processing as described by the description of the printer management module 503. Next the processing proceeds to step S903, and the print application 404 determines whether or not the print data has been received from the server 102 via the network transceiver module 405. If it is determined in step S903 that the print data has been received, the processing proceeds to step S904, and the print application 404 passes the setting values necessary for the print processing and the received print data to the print processing module 403. By this, the print processing module 403 performs the print processing based on the passed data, and the processing proceeds to step S908.

Meanwhile, if the print application 404 determined in step S903 that the print data was not able to be received, the processing proceeds to step S905, and the print application 404 determines whether or not it was possible to establish a communication connection for the network transceiver module 405 to download the print data. If it is determined here that the communication connection has been established, the processing returns to step S903 because a case in which the print data is received after a delay is possible, and reception of the print data is awaited. Meanwhile, if it is determined that it was not possible to establish a communication connection with the server 102, the processing proceeds to step S906, and the print application 404 determines whether or not all data of the print data has been received. If it is determined here that all data of the print data has been received, the processing proceeds to step S912, and the print application 404 awaits print completion from the print processing module 403.

Meanwhile, if it is determined in step S906 that all data of the print data has not been received, the processing proceeds to step S907, and the print application 404 examines the number of re-connections for performing a re-connection request to the server 102. If the number of re-connections does not exceed a threshold value of a maximum number of times, the processing returns to step S901, communication with the server 102 is established, and download of the print data is requested again.

Meanwhile, if the number of re-connections exceeds the threshold value of the maximum number of times, the print application 404 determines it cannot download subsequent print data from the server 102. Accordingly, in such a case the processing proceeds to step S908, and the print application 404 obtains from the print processing module 403 the number of pages that have been discharged in accordance with the print processing thus far, and notifies a print status to the server 102. Notification of the print status includes at least an identifier of the print data for which print processing is being performed, and includes a total number of pages that were originally scheduled for discharge, the number of pages that were discharged, or information of the current print status as explained by the print status 805 of FIG. 8.

In addition, in the print processing of step S904, each time the number of pages that have been discharged reaches a specific number or each predetermined interval, the print processing module 403 notifies the print application 404 of the number of pages that have been discharged. By this, the print application 404 receives the notification from the print processing module 403, and in step S908 notifies the server 102 of the print status. By this, upon receiving the notification of the print status from the printer 101, the print data management module 501 of the server 102 determines whether or not the print data identifier included in the notification is present in the print data identifier 803 in the management information illustrated in FIG. 8. If the identifier of the print data is included in the management information, the print data management module 501 updates the management information based on the print status and the number of pages that have been discharged, which are included in the received notification, and transmits a normal response to the printer 101.

Meanwhile, if the server 102 determines that the print data identifier included in the notification of the print status is not present in the management information, the print data management module 501 of the server 102 transmits a print data identification error to the printer 101.

In step S909 of FIG. 9, the print application 404 receives the response from the server 102 with respect to the notification of the print status, and determines whether it is a normal response or a print data identification error. Here, if it is the normal response, the processing proceeds to step S911, and the print application 404 determines whether or not all of the print data has been received. If there is unreceived data, the processing proceeds to step S903, and reception of subsequent print data is awaited. If it is determined in step S911 that all of the print data has been received, the processing proceeds to step S912, and the print application 404 performs disconnection processing for the communication connection for downloading print data with respect to the server 102, via the network transceiver module 405. Furthermore, the print application 404 determines whether the print processing module 403 has completed the print processing or whether it is still printing. In the case of printing, the processing returns to step S904, and the print processing by the print processing module 403 continues to execute. Meanwhile, if it is determined in step S912 that printing has completed, the processing proceeds to step S913, and the print log management module 402 records that printing normally terminated as a print history, and this processing completes.

Meanwhile, if it is determined in step S909 that the print application 404 receives the print data identification error from the server 102, the processing proceeds to step S910, and the print application 404 makes a request to the print processing module 403 to cancel the print processing. By this, upon accepting the cancel request, the print processing module 403 stops print processing that is being executed, and the processing proceeds to step S913. In step S913, the print log management module 402 records that the printing was cancelled as a print history, and terminates the processing. Note that the print processing module 403 that received the cancel request for print processing in step S913 collectively passes to the print log management module 402 a print data name 1003 and a user ID 1002 of FIG. 10, and the print cancellation history information as a portion of setting values received from the print application 404. By this, the print log management module 402 stores the information passed from the print processing module 403 as a print history.

In this way, by notifying a print status to the server 102 from the printer 101 during execution of print processing, for example even in a case where communication between the printer 101 and the server 102 is interrupted during printing, it is possible to detect an occurrence of the print data identification error.

As a different example to this, configuration may also be taken to proceed to the print processing cancellation of step S910 when an interruption of communication between the printer 101 and the server 102 is detected in step S905.

By virtue of this processing, for example in the case of FIG. 6, after communication is cut at reference numeral 607, when the number of re-connections exceeds the maximum number of times in step S907 of FIG. 9, the print status is notified in step S908, and since this is an error, the processing advances to step S910 and step S913. By this, when the client terminal 103 cancels printing while the printer 101 is receiving the print data, the printer 101 can record that printing has been cancelled as print history.

In addition, in a case where, after all print data has been received, the client terminal 103 cancels printing during printing of the print data as in the case of FIG. 7, the processing advances from step S906 to step S912 to step S904 to step S908 to step S909 and to step S910. By this, in step S913, the print log management module 402 can record that the printing was cancelled as a print history.

FIG. 10 is a figure illustrating an example of a print history which the printer 101 according to the first embodiment records in step S912 of FIG. 9.

A date and time 1001 describes a date and time at which print processing is terminated. When print processing by the print processing module 403 terminates, this date and time is notified to the print log management module 402. The user ID 1002 is the same as the user ID 802 of FIG. 8. A print data name 1003 is the same as the print data identifier 804 of FIG. 8. The user ID 1002 and the print data name 1003 are included in the setting values included in the download request obtained from the server 102 in step S902 of FIG. 9, and are notified to the print log management module 402 by the print processing module 403 through step S903. A print result 1004 indicates a result of print processing, and in FIG. 9 the print log management module 402 is notified of a print result achieved by processing by the print processing module 403. Printed pages 1005 is a history of the number of pages that have been discharged and the total number of pages scheduled for discharge, which are notified in step S908 of FIG. 9. The print log management module 402 records and manages history information as illustrated in FIG. 10.

In the example of FIG. 10, it is understood that printing of print data having the name of "aaa.pdf" was cancelled at the point in time when printing of 50 pages out of 200 pages had finished. In addition, it is understood that printing of other print data having the names of "bcd.jpg" and "efg.ras" has normally terminated.

Figure 11:
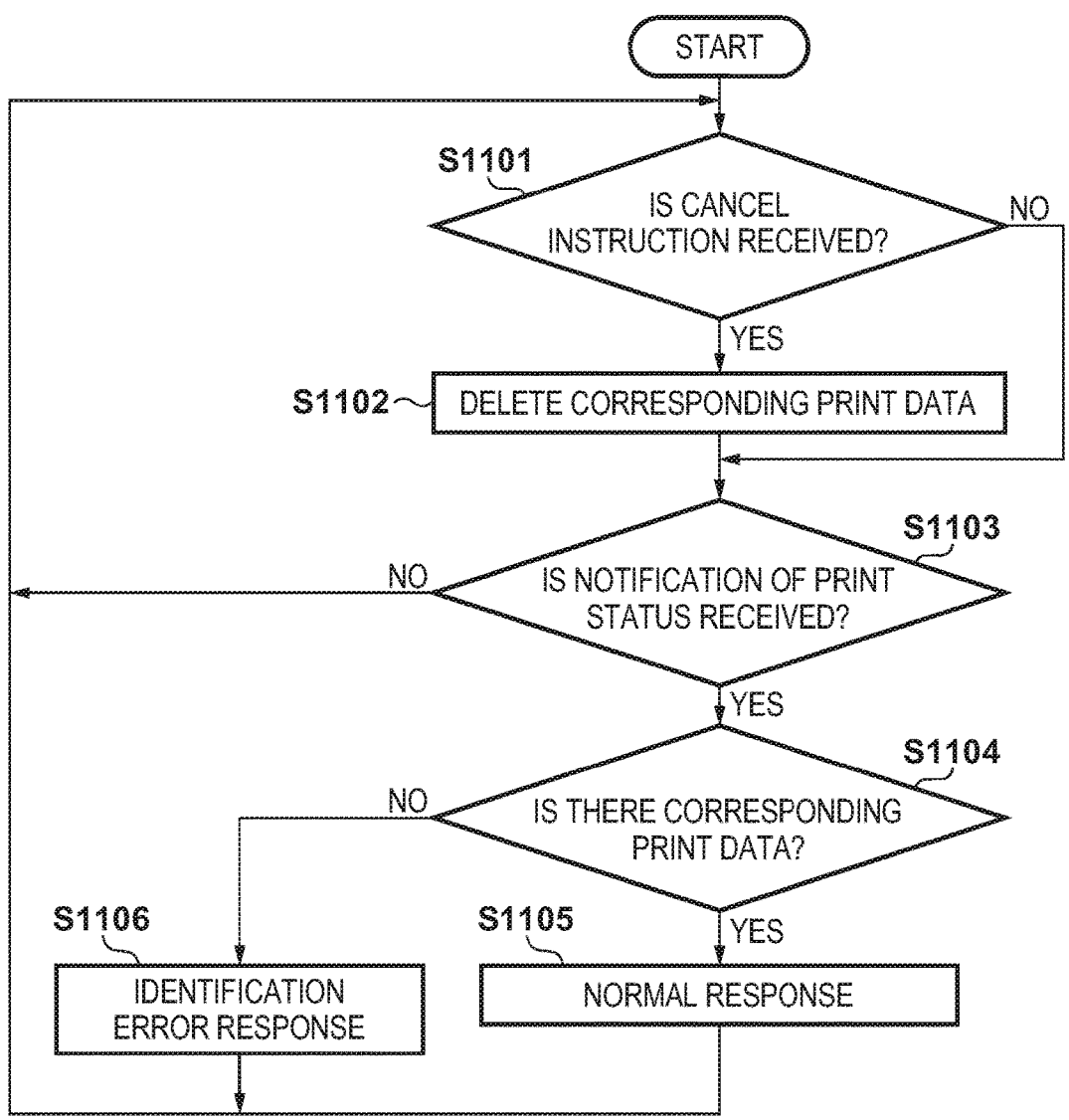
FIG. 11 is a flowchart for describing server processing according to the first embodiment.

FIG. 11 is a flowchart for explaining processing of the server 102 in accordance with the first embodiment. Note that a program for causing the CPU 301 to execute this processing is stored in the HDD 303, and, at a time of execution, the CPU 301 deploys this program to the RAM 302 and executes it to thereby achieve the processing indicated by this flowchart.

This processing is explained as processing that the server 102 executes when the printer 101 is executing the processing illustrated in FIG. 9. Firstly, in step S1101 the CPU 301 determines whether or not it has received from the client terminal 103 a cancel instruction for print processing of the print data. Upon receiving the cancel instruction the processing proceeds to step S1102, and the CPU 301 determines whether or not the print data for which the cancel instruction was made is being stored, and if being stored deletes the print data and advances the processing to step S1103. When the cancel instruction is not received in step S1101, the processing advances to step S1103.

In step S1103 the CPU 301 determines whether or not a status notification of the print processing being executed by the printer 101 has been received from the printer 101. When the status notification of the print processing has not been received, the processing proceeds to step S1101. Upon receiving the status notification of the print processing in step S1103, the processing proceeds to step S1104, and the CPU 301 determines whether or not corresponding print data for the notification is being stored, in other words whether or not it has been deleted in accordance with the cancel instruction. When the print data is stored, the processing advances to step S1105, and the CPU 301 returns a normal response to the printer 101, and the processing proceeds to step S1101. Meanwhile, if it is determined in step S1104 that the print data is not stored, the processing advances to step S1106, and the CPU 301 returns the print data identification error to the printer 101, and the processing proceeds to step S1101.

By this, the printer 101, in step S909 of FIG. 9, can recognize that the print data has already been canceled by the server 102.

By the first embodiment as explained above, when cancellation of printing of print data is made from a client terminal during printing of the print data, it is possible to store that print processing therefor has been cancelled as a print history in the printer.

[Second Embodiment]

Figure 12:
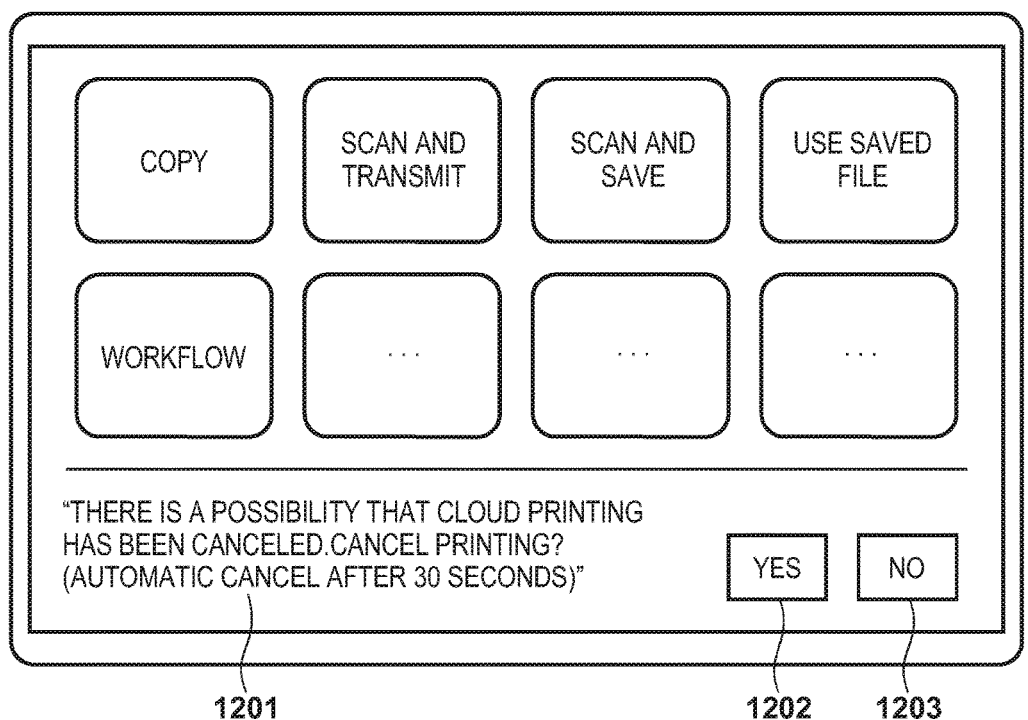
FIG. 12 depicts a view illustrating an example of a UI screen displayed in a console unit of a printer according to a second embodiment.

In the first embodiment described above, upon determination of a print data identification error in step S909 of FIG. 9, the printer 101 cancelled the print processing in step S910. In contrast to this, in a second embodiment explanation is given of an example in which an operator of the printer 101 cancels printing via a UI (user interface) as illustrated in FIG. 12 for example. Note that because configuration of the printer 101, the server 102, the client terminal 103, and configuration of the print system according to the second embodiment is the same as that of the previously described first embodiment, explanation thereof is omitted.

FIG. 12 depicts a view illustrating an example of a UI screen displayed in the console unit 204 of the printer 101 according to the second embodiment.

Explanation is given here of processing in step S910 when the print application 404 receives the print data identification error response from the server 102 in step S909 of FIG. 9.

In the second embodiment, in step S910 the print application 404 performs a print processing interrupt request to the print processing module 403. By this, the print processing module 403 temporarily interrupts the print processing upon receiving the interrupt request. In addition, the print application 404 makes a notification to the message display module 401, so as to display a message 1201 as illustrated in FIG. 12.

By this, it is possible to cause an operator of the printer 101 to select whether to cancel the print processing that has been temporarily interrupted or to continue to print.

However, considering a case in which the operator of the printer 101 is not present close to the printer 101 or a case in which the operator does not make a selection, configuration may be taken to automatically cancel the print processing if a YES button 1202 or a NO button 1203 of FIG. 12 is not selected within a predetermined time interval. Cancellation processing in such a case is similar processing to the cancellation processing of step S910 of FIG. 9. In addition, if the NO button 1203 is selected, the processing advances to step S911 without cancelling the print processing.

[Third Embodiment]

Next, explanation will be given for a third embodiment of the present invention. In the third embodiment, explanation is given of an example in which, when the printer 101 receives the print data from the server 102, the print data is designated as "storing printing". In the third embodiment, the printer 101 completes the reception of print data for which storing printing is designated, and then storage of the print data terminates. Explanation is given of a case in which the print data is deleted by the server 102 (the print job is cancelled) before printing by the printer 101 is instructed. At this point, upon receiving a notification that the print data has been deleted from the server 102, the printer 101 deletes the print data stored by the printer 101 that corresponds to the print data deleted by the server 102. Note that because the hardware configuration or the like of the printer 101 and the server 102 according to the third embodiment is the same as in the previously described embodiments, explanation thereof is omitted.

Figure 13:
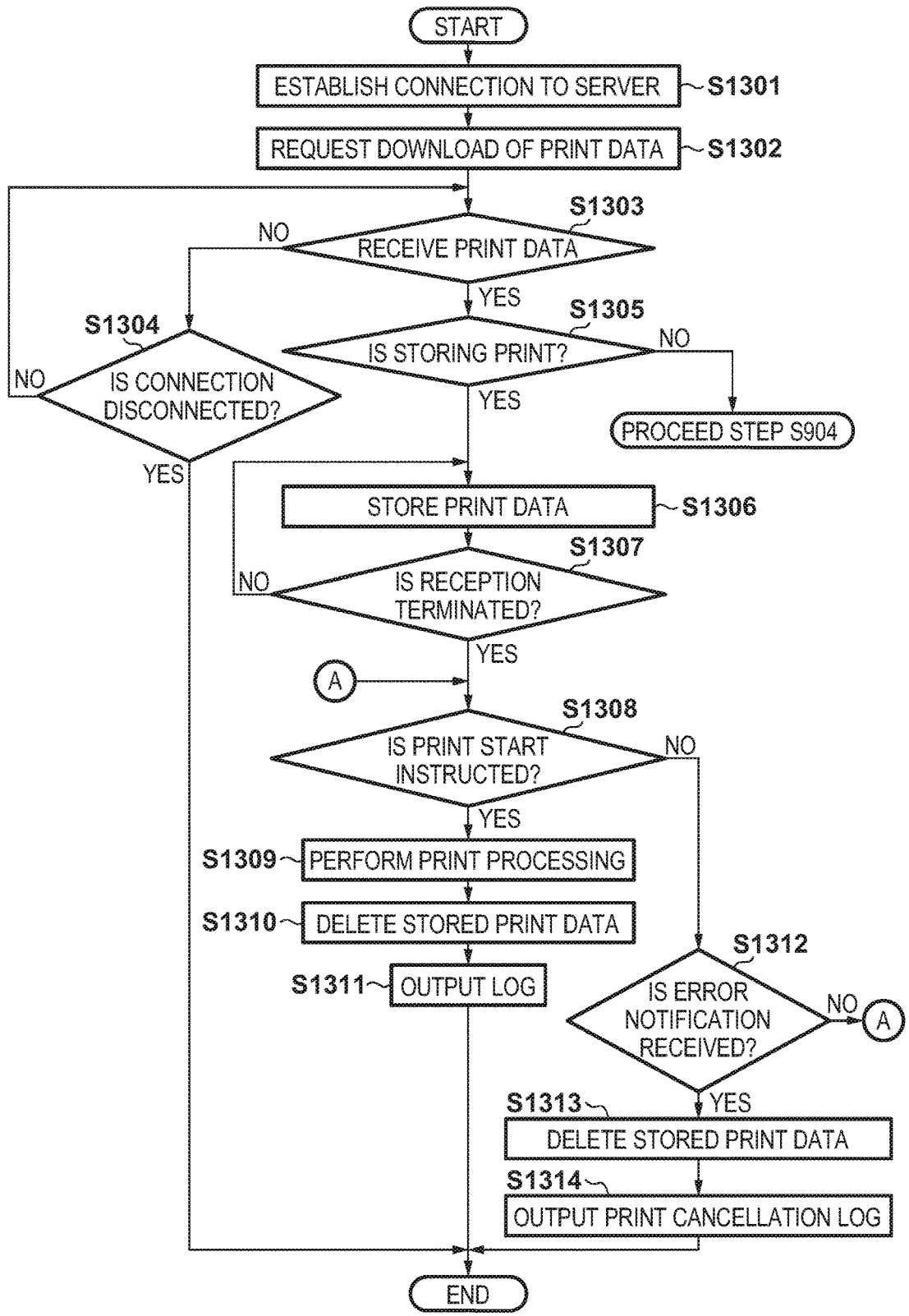
FIG. 13 is a flowchart for describing print processing by the printer according to a third embodiment.

FIG. 13 is a flowchart for describing print processing by the printer 101 according to the third embodiment. Note that a program for causing the CPU 201 to execute this processing is stored in the HDD 203, and, at a time of execution, the CPU 201 deploys this program to the RAM 202 and executes it to thereby achieve the processing indicated by this flowchart. Note that explanation is given here of processing that the software function illustrated in FIG. 4 executes.

The processing is started by the print application 404 receiving an existence notification of print data from the server 102 via the network transceiver module 405. Note that, because the processing of step S1301 through step S1303 is the same as the previously described processing of step S901 through step S903 of FIG. 9, explanation thereof is omitted. When it is determined in step S1303 that the print data has been received, the processing proceeds to step S1305, and the print application 404 determines whether or not the print data is designated as "storing printing". When the print data is not received in step S1303, the processing proceeds to step S1304, whether or not the connection with the server 102 has been disconnected is determined, if communication has been disconnected the processing terminates, otherwise the processing proceeds to step S1303. If it is determined in step S1305 that the print data is not designated as storing printing, the processing proceeds to step S904 of FIG. 9, and the print data is printed.

Meanwhile, if it determined in step S1305 that the print data is designated as "storing printing", the processing advances to step S1306, and the received print data is stored to the HDD 203. The processing advances to step S1307, and the print application 404 determines whether or not all data of the print data has been received. If it is determined here that all data of the print data is received, the processing proceeds to step S1308, and otherwise the processing proceeds to step S1306.

In step S1308, the print application 404 determines whether or not an instruction for printing of the stored print data has been made from the console unit 204, and if there is a print instruction, the processing proceeds to step S1309, otherwise the processing proceeds to step S1312. In step S1309 the print application 404 passes to the print processing module 403 setting values necessary for print processing and the received print data. By this, the print processing module 403 performs the print processing based on the passed data, and the processing proceeds to step S1310. In step S1310 the print application 404 deletes the printed print data. The processing proceeds to step S1311, and the print log management module 402 records that printing normally terminated in the print history, and this processing completes.

In step S1312 the print application 404 determines whether or not it has received an error notification indicating that the received print data has been deleted by the server 102. If the error notification is received here, the processing proceeds to step S1313, otherwise the processing proceeds to step S1308. The error notification includes the previously described print data identifier and the print data name. In step S1313 the print application 404 deletes the stored print data corresponding to the print data identifier and the print data name. The processing proceeds to step S1314, the print log management module 402 records that the printing of the print data was cancelled as a print history, and terminates the processing.

As explained above, by the third embodiment, when the printer 101 is storing print data due to storing printing, if the print data is deleted by the server 102 when printing of the print data by the printer has not been started, the printer 101 is able to not print the print data. By this, it is possible to prevent printing of cancelled print data and wasteful consumption of recording materials such as paper or toner.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-052969, filed Mar. 16, 2016, which is hereby incorporated by reference herein in its entirety.

What is claimed is:

1. An image forming apparatus capable of communicating with a server, the apparatus comprising:
    (A) an image forming device configured to form an image on a sheet based on print data;
    (B) a memory device that stores a set of instructions; and
    (C) at least one processor that executes instructions out of the set of instructions:
        (a) to obtain print data transmitted from the server;
        (b) to cause the image forming device to start image formation based on the obtained print data;
        (c) to notify the server of identification information of the print data after the start of the image formation;
        (d) to receive error information from the server as a response to the notification in a case that the server determines that the identification information of the print data does not match identification information stored in the server; and
        (e) to cause the image formation by the image forming device to stop in accordance with receiving the error information from the server.

2. The image forming apparatus according to claim 1, wherein the at least one processor executes instructions, when obtaining the print data from the server, to obtain the print data from the server in response to an existence notification of the print data from the server.

3. The image forming apparatus according to claim 1, wherein the at least one processor executes instructions to further notify information relating to a number of pages on which an image is formed by the image formation.

4. The image forming apparatus according to claim 3, wherein the at least one processor executes instructions to notify, at a predetermined time interval, the information relating to a number of pages on which an image is formed by the image formation.

5. The image forming apparatus according to claim 1, wherein the at least one processor executes instructions to further record information indicating that printing of the print data has been cancelled by the server, as information relating to print data for which image formation is stopped.

6. The image forming apparatus according to claim 5, wherein, if communication with the server is cut during obtainment of the print data, the at least one processor executes instructions to further record information indicating that the print data has been cancelled.

7. An image forming apparatus capable of communicating with a server, the apparatus comprising:
    (A) an image forming device configured to form an image on a sheet based on print data;
    (B) a memory device that stores a set of instructions; and
    (C) at least one processor that executes instructions out of the set of instructions:
        (a) to obtain print data transmitted from the server;
        (b) to store the print data in a memory;
        (c) to transmit identification information of the print data to the server after the print data has been stored in the memory;
        (d) to receive error information from the server as a response to a transmission of the identification information in a case that the server determines that the identification information of the print data does not match identification information stored in the server; and
        (e) to delete the print data corresponding to the error information, in accordance with receiving the error information from the server.

8. The image forming apparatus according to claim 7, wherein the at least one processor executes instructions to further record information indicating that the print data corresponding to the error information has been deleted.

9. The image forming apparatus according to claim 7, wherein the at least one processor executes instructions, when obtaining the print data from the server, to obtain the print data from the server in response to an existence notification of the print data from the server.

10. A method of controlling an image forming apparatus that can communicate with a server and has an image forming device for forming an image on a sheet based on print data, the method comprising:
    obtaining the print data from the server;
    causing the image forming device to start image formation based on the obtained print data;
    notifying the server of identification information of the print data after the start of image formation;
    receiving error information from the server as a response to the notification in a case that the server determines that the identification information of the print data does not match identification information stored in the server; and
    causing the image formation by the image forming device to stop in accordance with receiving the error information from the server.

11. A method of controlling an image forming apparatus that can communicate with a server and has an image forming device for forming an image on a sheet based on print data, the method comprising:
- obtaining the print data from the server;
- storing the obtained print data in a memory;
- transmitting identification information of the print data to the server after the print data is stored in the memory;
- receiving error information from the server as a response to transmission of the identification information in a case that the server determines that the identification information of the print data does not match identification information stored in the server; and
- deleting, in accordance with receiving the error information relating to the identification information from the server in response to transmission of the identification information, the print data corresponding to the error information that is stored in the memory.

12. An image forming system in which an image forming apparatus and a server communicate with each other,
wherein the server comprises:
- (A) a memory device that stores a set of instructions; and
- (B) at least one processor that executes instructions out of the set of instructions:
  - (a) to register identification information of print data in a storage;
  - (b) to transmit the print data to the image forming apparatus;
  - (c) to receive a notification of the identification information of the print data from the image forming apparatus; and
  - (d) to transmit error information to the image forming apparatus in accordance with the storage not registering the identification information of the notification, and wherein the image forming apparatus comprises:
- (A) an image forming device configured to form an image on a sheet;
- (B) a memory device that stores a set of instructions; and
- (C) at least one processor that executes instructions out of the set of instructions:
  - (a) to obtain the print data transmitted from the server;
  - (b) to cause the image forming device to start image formation based on the obtained print data;
  - (c) to notify the server of the identification information of the print data after the start of image formation; and
  - (d) to cause the image formation by the image forming device to stop in accordance with receiving the error information from the server as a response to the notification.

13. The image forming system according to claim 12, wherein the at least one processor of the server executes the instructions further to delete the identification information registered in the storage in accordance with a request from an external apparatus.

14. An image forming system in which an image forming apparatus and a server communicate with each other,
wherein the server comprises:
- (A) a memory device that stores a set of instructions; and
- (B) at least one processor that executes instructions out of the set of instructions:
  - (a) to register identification information of print data in a storage;
  - (b) to transmit the print data to the image forming apparatus;
  - (c) to receive a notification of identification information of the print data from the image forming apparatus; and
  - (d) to transmit error information to the image forming apparatus in accordance with the storage not registering the identification information of the notification, and wherein the image forming apparatus comprises:
- (A) an image forming device configured to form an image on a sheet based on print data;
- (B) a memory device that stores a set of instructions; and
- (C) at least one processor that executes instructions out of the instructions to:
  - (a) to obtain the print data transmitted from the server;
  - (b) to store the obtained print data in a memory;
  - (c) to transmit the identification information of the obtained print data to the server after the print data has been stored in the memory; and
  - (d) to delete the print data corresponding to the error information that is stored in the memory, in accordance with receiving the error information from the server in response to transmission of the identification information.

15. The image forming system according to claim 14, wherein the at least one processor of the server executes the instructions further to delete the identification information registered in the storage in accordance with a request from an external apparatus.

* * * * *